(12) United States Patent
Abbott

(10) Patent No.: US 8,934,775 B2
(45) Date of Patent: Jan. 13, 2015

(54) SYSTEM AND METHOD FOR SIGNALING BETWEEN ELEMENTS IN AN UNDERSEA OPTICAL COMMUNICATION SYSTEM AND SYSTEM INCORPORATING THE SAME

(75) Inventor: Stuart M. Abbott, Marlboro, NJ (US)

(73) Assignee: Tyco Electronics Subsea Communications LLC, Eatontown, NJ (US)

( * ) Notice: Subject to any disclaimer, the term of this patent is extended or adjusted under 35 U.S.C. 154(b) by 1465 days.

(21) Appl. No.: 12/178,170

(22) Filed: Jul. 23, 2008

(65) Prior Publication Data

US 2009/0028566 A1    Jan. 29, 2009

Related U.S. Application Data

(60) Provisional application No. 60/951,288, filed on Jul. 23, 2007.

(51) Int. Cl.
| | |
|---|---|
| *H04B 10/00* | (2013.01) |
| *H04B 10/038* | (2013.01) |
| *H04B 10/079* | (2013.01) |
| *H04B 10/80* | (2013.01) |
| *H04B 10/12* | (2006.01) |

(52) U.S. Cl.
CPC .......... *H04B 10/038* (2013.01); *H04B 10/0791* (2013.01); *H04B 10/808* (2013.01)
USPC ............................ 398/104; 398/105; 398/181

(58) Field of Classification Search
CPC ..... H04B 10/80; H04B 10/806; H04B 10/808
USPC ................... 398/30–33, 37, 83, 93, 104, 105, 398/173–181
See application file for complete search history.

(56) References Cited

U.S. PATENT DOCUMENTS

| | | | | |
|---|---|---|---|---|
| 4,334,303 | A | * | 6/1982 | Bertin et al. ................... 370/243 |
| 6,169,240 | B1 | * | 1/2001 | Suzuki ............................ 84/605 |
| 6,414,405 | B1 | | 7/2002 | Schesser et al. |
| 2003/0108351 | A1 | | 6/2003 | Feinberg et al. |
| 2005/0191054 | A1 | * | 9/2005 | Aoki et al. ...................... 398/45 |
| 2006/0034617 | A1 | | 2/2006 | Reintjes et al. |

(Continued)

FOREIGN PATENT DOCUMENTS

| | | |
|---|---|---|
| JP | 07-115390 | 5/1995 |
| JP | 07115390 A * | 5/1995 |
| JP | 2003-188660 | 7/2003 |

(Continued)

OTHER PUBLICATIONS

International Search Report and Written Opinion dated Sep. 29, 2008 issued in related International Patent Application No. PCT/US08/70886.

(Continued)

*Primary Examiner* — Daniel Dobson

(57) ABSTRACT

A system for signaling between elements in an undersea optical communication system including a cable signal generator. The signal generator includes line current modulation circuitry configured to impart modulation in line current provided on a power conductor of the transmission cable. A method of signaling between elements in an undersea optical communication system includes modulating a line current through an element and detecting the modulated current.

16 Claims, 3 Drawing Sheets

(56) References Cited

U.S. PATENT DOCUMENTS

2007/0024957 A1* 2/2007 Charlet et al. ............... 359/334
2010/0092178 A1* 4/2010 Liu et al. .................... 398/105

FOREIGN PATENT DOCUMENTS

| WO | 97/32409 A1 | 9/1997 |
| WO | 2006094225 | 9/2006 |
| WO | WO2006-094225 | 9/2006 |
| WO | WO 2006094225 A2 * | 9/2006 |

OTHER PUBLICATIONS

Otani et al., "Fault Localization of Optical WDM Submarine Cable Networks Using Coherent Optical Time-Domain Reflectometry," IEEE Photonics Technology Letters, vol. 10, No. 7, pp. 1000-1002, 1998.

"A Monitoring Device for Underwater Optical Cable Networks", NEC Technical Bulletin, Japan, NEC Corporation, Dec. 2009, vol. 62, No. 4, pp. 36-40 obtained from http://www.nec.co.jp/techrep/ja/journal/g09/n04/090408.pdf.

Japanese Office Action mailed Apr. 17, 2012 in connection with related Japanese Patent Application No. 2010-518353.

Chinese Office Action mailed May 9, 2012 in corresponding Chinese Patent Application Serial No. 200880100053.3.

Supplemental European Search Report issued in corresponding European Patent Application No. 08782259, completed on May 7, 2014.

* cited by examiner

SYSTEM AND METHOD FOR SIGNALING BETWEEN ELEMENTS IN AN UNDERSEA OPTICAL COMMUNICATION SYSTEM AND SYSTEM INCORPORATING THE SAME

CROSS-REFERENCE TO RELATED APPLICATIONS

The present application claims the benefit of the filing date of U.S. Provisional Application Ser. No. 60/951,288, filed Jul. 23, 2007, the teachings of which are hereby incorporated herein by reference.

TECHNICAL FIELD

The present application relates to the optical communication systems and, more particularly, to a system and method for signaling between elements in an undersea optical communication system and a system incorporating the same.

BACKGROUND

Undersea optical communication systems may include an optical transmission path extending between shore stations separated by distances of 10,000 km or more. The optical transmission path may include an optical fiber cable coupled from one shore station to another through numerous elements, such as repeaters, branching units, etc. The optical fiber cable may include multiple optical fiber pairs for bi-directional transmission of information, e.g. on a plurality of separate wavelength channels in a wavelength division multiplexed (WDM) system, and a power conductor for providing electrical energy required for operation of elements connected thereto. The optical fiber cable, as well as housings associated with elements connected thereto, may rest on the ocean floor.

During the operational life of an undersea optical communication system, the elements thereof may require repair, replacement, modification or upgrade. To perform any of these tasks the cable and the subject element must be located on the ocean floor. To locate the element, a ship may travel to an expected general location of the element, and a search may be conducted to specifically locate the element.

In addition, various elements within an undersea system may be selectively configurable by signaling from a shore station. A branching unit, for example, may be configured to a grounded or ungrounded state using a control signal sent from an associated transceiver. It may be useful to in such a system to obtain a confirmation signal from the element confirming that it has been configured in the desired operating condition.

BRIEF DESCRIPTION OF THE DRAWINGS

Reference should be made to the following detailed description which should be read in conjunction with the following figures, wherein like numerals represent like parts.

DETAILED DESCRIPTION

Figure 1:
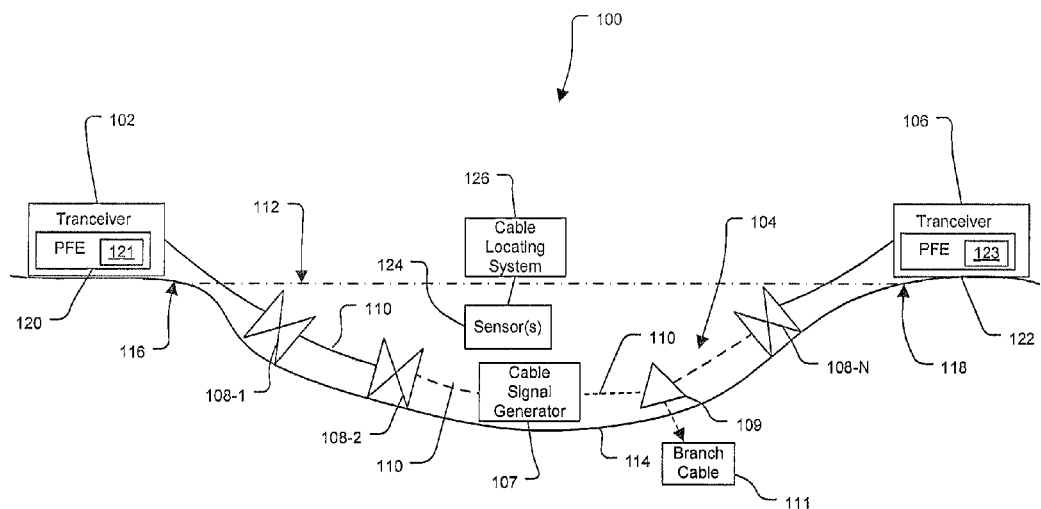
FIG. 1 is a simplified block diagram of one exemplary embodiment of an optical communication system consistent with the present disclosure.

Turning now to FIG. 1, there is illustrated an exemplary optical communication system 100 consistent with the present disclosure. Those skilled in the art will recognize that the system 100 has been depicted as a highly simplified point-to-point system for ease of explanation. It is to be understood the present disclosure may be incorporated into a wide variety of optical networks and systems.

The illustrated exemplary optical communication system 100 includes a first transceiver 102 and a second transceiver 106 connected via an optical transmission path 104. For ease of explanation the description herein may refer to transmission from one transceiver to another. It is to be understood, however, that the system 100 may be may be configured for bi-directional communication between the transceivers 102, 106.

The system 100 may be configured as a wavelength division multiplexed (WDM) system, wherein the transceiver 102 may generate a plurality of separate optical signals by modulating data on each of a plurality of different wavelengths/channels within a signal bandwidth. The channels may be multiplexed into an aggregate optical signal and transmitted by the transceiver 102 over the optical information path 104 to the transceiver 106. At the transceiver 106, the aggregate signal may be demultiplexed into the separate optical signals for demodulation of the data modulated thereon.

For simplicity and ease of explanation, the illustrated exemplary optical transmission path 104 includes, optical transmission cable 110 with repeaters 108-1, 108-2 . . . 108-N, a cable signal generator 107, and a branching unit 109 coupled thereto. Those of ordinary skill in the art will recognize that, depending on system characteristics and requirements other active and passive components may be incorporated into the transmission path 104 and the number of repeaters, cable signal generators and branching units may vary. Also, the illustrated exemplary embodiment includes a stand-alone cable signal generator 107. It is to be understood, however, that a cable signal generator consistent with the present disclosure may be incorporated into any one or more of the elements coupled to the optical transmission path including, for example, one or more of the repeaters 108-1, 108-2, . . . 108-N, the branching unit 107 or any other active or passive element coupled to the optical path.

In addition to incorporating a cable signal generator consistent with the present disclosure, one or more of the optical elements in the transmission path may include known configurations for achieving their intended functionality. The repeaters 108-1, 108-2 . . . 108-N may include any known optical amplifier/repeater configuration that compensates for signal attenuation on the transmission path 104. For example, one or more of the repeaters may be configured as an optical amplifier repeater including a known optical amplifier configuration, such as an erbium doped fiber amplifier, a Raman amplifier, or a hybrid Raman/EDFA amplifier. Also, one or more of the repeaters may be provided in a known optical-electrical-optical configuration that regenerates an optical signal by converting it to an electrical signal, processing the electrical signal and then retransmitting the optical signal.

The branching unit 107 may include any known branching unit configuration that splits the cable, e.g. to a branch cable 111, to allow data transmission to more than one destination. Known branching units include configurations that split the cable by, for example, physically separating the signal-carrying fibers to direct one group of fibers in one direction, e.g. to the transceiver 106 and another group in another direction, e.g. to the branch cable 111. Other known configurations may split the cable by converting the optical signals to electrical signals, using an add-drop multiplexer to divide and recombine the signals on the desired paths, then reconverting back to optical signals. Other configurations use an optical add-drop multiplexer (OADM) to direct optical carrier frequencies down desired paths. Combinations of techniques may also be implemented.

System 100 may be configured as a long-haul system, e.g. having a length from the transceiver 102 to the transceiver 106 of more than about 600 km, and may span a body of water 112. When used to span a body of water, e.g. an ocean, repeaters 108-1, 108-2 . . . 108-N, cable signal generator 107 and the branching unit 109 may be seated on the ocean floor 114 and the transmission path 104 may span between beach landings 116, 118 to extend from the water 112 for coupling to the transmitter 102 and receiver 106. It will be appreciated that a plurality of optical transmission components may be coupled to the transmission path 104 and may be disposed beneath water and/or over land.

As is known to those of ordinary skill in the art, the transmission cable 110 may include a number of individual optical fibers for bi-directionally carrying optical signals and a power conductor for supplying power to the elements coupled to the cable 110. The cable power conductor may be coupled to known power feed equipment (PFE) 120, 122 at the transceiver 102 and/or transceiver 106. The PFE 120, 122 may be configured to supply and regulate the necessary electrical energy for operation of the elements coupled to the cable.

In general, a cable signal generator 107 and any optical element incorporating a cable signal generator consistent with the present disclosure may be configured to impart a modulation, e.g. a periodic modulation, in the line current on the power conductor of the optical transmission cable 110. The modulated line current may be detected by one or more sensors 124 deployed from a cable locating system 126, such as a repair ship. The sensors 124 may include any known configuration for sensing modulation of current in a conductor, such as an electromagnetic sensor for sensing field variation adjacent a current carrying conductor.

The modulation imparted by the cable signal generator 107 may be a low frequency periodic modulation. In one embodiment, the line current may be modulated at a frequency of about 25 Hz. The current modulation may be strongest at a point where the transmission cable 110 connects to the cable signal generator 107 and may attenuate with distance form the cable signal generator. As such, sensors 124 may be configured to locate the cable signal generator or any element incorporating a cable signal generator by identifying the location of maximum line current modulation.

The cable signal generator 107 may also or alternatively impart a non-periodic modulation in the line current that may be detected at a transceiver, e.g. by current and or voltage regulator circuitry 121,123 in the PFE 120, 122, or other shore-based sensor. Signaling from a cable signal generator to a shore-based sensor may be used for confirmation that an undersea element incorporating the cable signal generator has been configured in a desired state. For example, a cable signal generator 107 may be incorporated into a branching unit selectively configurable to an ungrounded or grounded state. When the branching unit is set to a grounded state, e.g. through a command sent from a transceiver, the cable signal generator may impart a non-periodic voltage drop across the branching unit which results in a modulation of the line current. The line current modulation may be detected by the shore-based sensor thereby providing confirmation that the desired configuration of the branching unit has been achieved.

Figure 2:
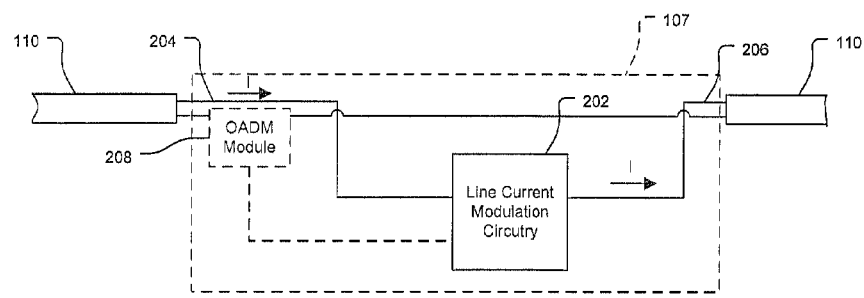
FIG. 2 is block diagram of one exemplary cable signal generator consistent with the present disclosure.

Turning now to FIG. 2, there is illustrated one exemplary embodiment of a cable signal generator 107 consistent with the present disclosure. The illustrated exemplary embodiment includes line current modulation circuitry 202 coupled between first 204 and second 206 optical cable power conductors. In general, the line current modulation circuitry 202 may be configured for establishing a modulation in line current I through the power conductors 204, 206. The line current modulation circuitry 202 may include active or passive components, or combinations thereof, for imparting a periodic or non-periodic modulation in the line current I.

Figure 3:
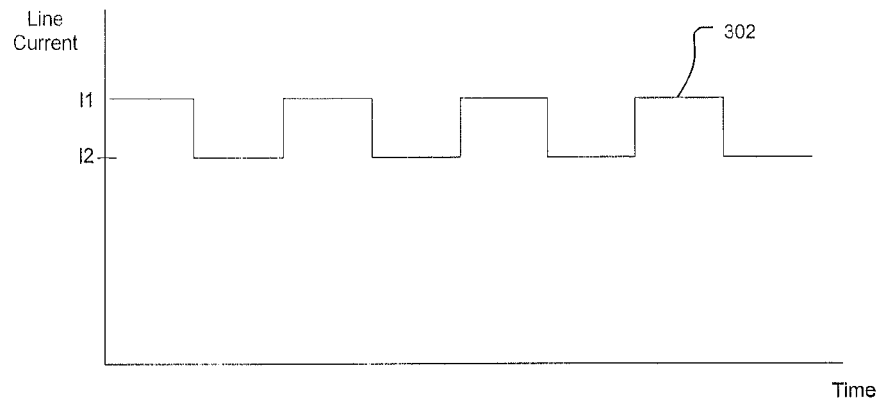
FIG. 3 includes a plot of line current vs. time exhibiting a modulated line current generated in an exemplary system consistent with the present disclosure.

In one embodiment, the line current modulation circuitry 202 may impart a time varying voltage drop across the cable signal generator, resulting in a corresponding modulation of the line current. FIG. 3, for example, includes a plot 302 of line current vs. time illustrating line a periodic line modulation of line current between peak line current values I1 and I2. The line current modulation may be established at a magnitude and frequency allowing detection by the sensors 124 positioned adjacent the signal generator. In another embodiment, the line current modulation circuitry 202 may impart a non-time varying voltage drop across the cable signal generator, resulting in a non-periodic modulation of the line current that may be detected by a shore-based sensor, such as voltage or current regulating circuitry 121,123 in the PFE 120, 122.

The line current modulation circuitry 202 may be normally in a shunting or "off" condition to shunt the line current through the cable signal generator 107 without imparting line current modulation to reduce power consumption in the cable signal generator. In one embodiment, the cable signal generator 107 may be configured to selectively impart the line current modulation in response to a command signal sent from a transceiver 102 or 106 on an optical command channel of the system 100. An optional and known OADM module 208 may be coupled to the optical fiber of the transmission cable carrying the command signal, and may be configured to direct the command signal to the line current modulation circuitry 202. In response to the command signal, the line current modulation circuitry 202 may modulate the line current to allow detection thereof by sensors 124 and/or a shore-based sensor, e.g. 121,123. The line current modulation circuitry 202 may be configured to transmit a responsive command on the command channel indicating it has been configured to modulate the line current. A separate command signal may be sent by a transceiver to cause the line current modulation circuitry 202 to discontinue line current modulation.

Figure 4:
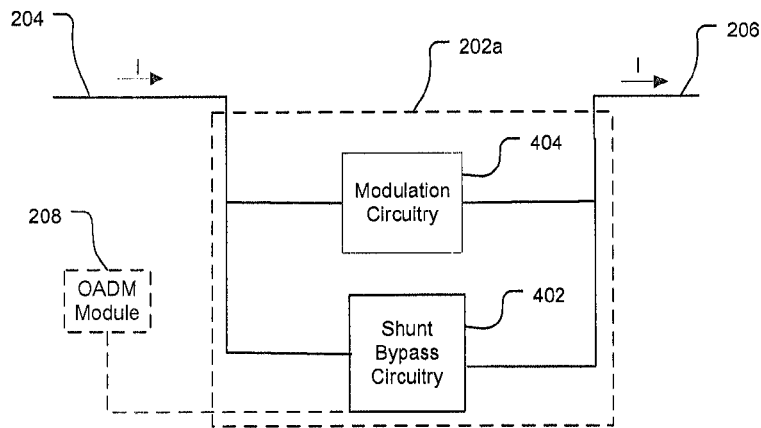
FIG. 4 is block diagram of an exemplary cable signal generator consistent with the present disclosure with modulation circuitry.

FIG. 4 illustrates one exemplary configuration for line current modulation circuitry 202a consistent with the present disclosure. The illustrated exemplary embodiment includes: a shunt bypass circuitry 402 coupled in parallel with modulation circuitry 404 between first 204 and second 206 optical cable power conductors. In general, the shunt bypass circuitry 402 may be configured for selectively shunting line current I around the modulation circuitry 404 in response to a command signal coupled thereto by the OADM module 208. The shunt bypass circuitry 402 may be configured to present low impedance in one state and a relatively high impedance in another state, whereby a periodic change in state from low impedance to high impedance results in line current alternately passing through the shunt bypass circuitry 402 and the modulation circuitry 404. Periodic shunting of line current around the modulation circuitry 404 may establish a modulation in the voltage drop across the cable signal generator and a corresponding modulation in the line current I through the power conductors 204, 206. The shunt bypass circuitry 402 may also be configured to maintain a high impedance state whereby line current is non-periodically directed through the modulation circuitry 404 to establish a non-periodic line current modulation.

Figure 5:
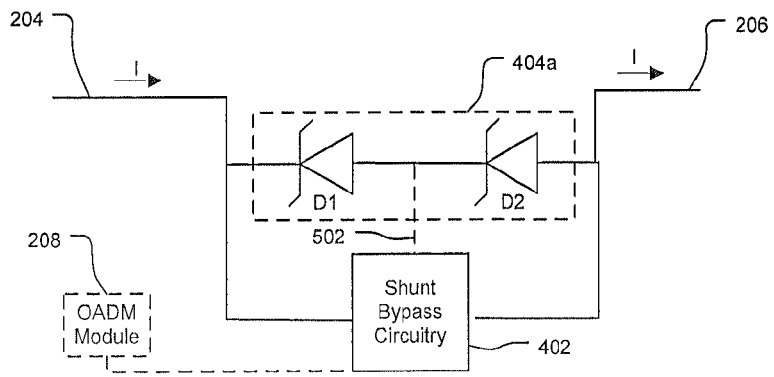
FIG. 5 is block diagram of another exemplary cable signal generator consistent with the present disclosure with modulation circuitry including zener diodes.

FIG. 5 illustrates one exemplary embodiment of modulation circuitry 404a consistent with the present disclosure. As shown, the modulation circuitry 404a may include first D1 and second D2 series connected power zener diodes coupled in parallel with the shunt bypass circuitry 402 between the first 204 and second 206 optical cable power conductors. Although the illustrated exemplary embodiment includes two zener diodes, it is to be understood that any number of zener diodes may be used in the modulation circuitry.

The breakdown voltages of the zener diodes D1, D2 may be selected to establish a desired voltage drop when the shunt bypass circuitry 402 is in a high impedance state and the line current is forced through the modulation circuitry 404a. In one embodiment, for example, the zener diodes D1, D2 may be 7V zener diodes and the bypass circuitry 402 may present a high impedance to pass line current through both of the diodes to add 14V to the voltage drop through the cable signal generator. In another embodiment, the bypass circuitry 402 may be selectively configured to shunt current around one or more of the diodes zener diodes D1, D2, but force line current through the other diodes to add desired voltage drop through the cable signal generator. For example, the shunt bypass circuitry 402 may present a relatively low impedance path around diode D1, but present a high impedance path with respect to diode D2, forcing current through optional path 502 and through the zener diode D2 and adding a 7V voltage drop through the cable signal generator.

Periodically switching between high and low impedance states of the shunt bypass circuitry 402 to periodically bypass the diodes D1, D2 results in a modulation of the voltage drop across the cable signal generator and a corresponding modulation in the line current I that may be detected by sensors 124 deployed from a cable locating system 126. In one embodiment, it may be desirable to achieve a minimum current modulation of 10 mA RMS to enable detection by sensors 124. Using a configuration as shown in FIG. 5 wherein diodes D1, D2 are 7V zener diodes, periodically bypassing the zener diodes at a frequency of about 25 Hz may provide a maximum voltage modulation of 14V peak-to-peak. If the dynamic transmission cable impedance is 150 ohms at 25 Hz, the current modulation at the input to the cable signal generator may be about 16.5 mA RMS (5V rms/300 ohms). Using additional zener diodes would provide a larger current modulation.

Figure 6:
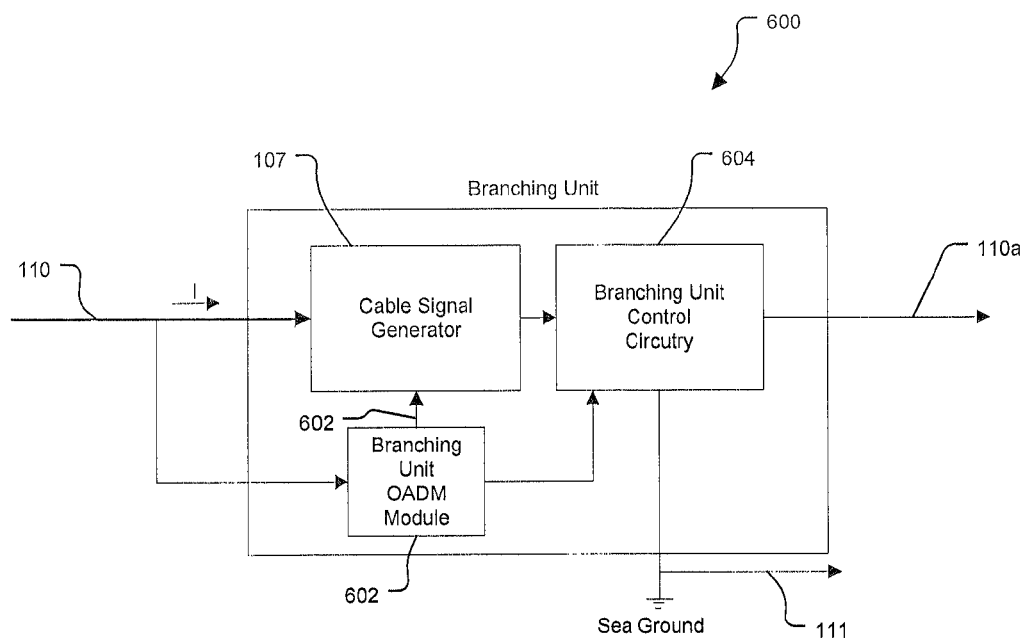
FIG. 6 is a block diagram of one exemplary embodiment of a branching unit including a cable signal generator consistent with the present disclosure.

FIG. 6 illustrates an exemplary embodiment 600 of a submarine branching unit including a cable signal generator 107 consistent with the present disclosure. Although FIG. 6 illustrates a branching unit, it is to be understood that a cable signal generator 107 may be incorporated into any undersea element of an optical transmission system to provide cable signaling. The branching unit 600 includes the cable signal generator 107, a branching unit OADM module 602 and branching unit control circuitry 604. The branching unit OADM module 602 may be configured to split signals from incoming transmission cable 110 to outgoing 110a and branch cables 111. The branching unit control circuitry 604 may be selectively configurable in one or more states in response to an optical command signal provided on the transmission cable 110 and directed to the branching unit control circuitry 604 by the branching unit OADM module 602. Configurations for the branching unit control circuitry 604 and branching unit OADM module 602 for directing a command signal to the branching unit control circuitry are known.

In the illustrated exemplary embodiment, the branching unit OADM module 602 may be configured to provide a command signal, e.g. on path 606, to the cable signal generator 107 for selectively modulating line current through the branching unit. The cable signal generator 107 may be responsive to the command signal for imparting a periodic modulation of the line current I to assist in locating the branching unit 600 in an undersea environment, e.g. using sensors 124. In addition or alternatively, the cable signal generator 107 may impart a non-periodic modulation of the line current I corresponding to a command setting the branching unit 600 to a desired state. The non-periodic modulation may be detected by a shore-based sensor, e.g. 121, 123 in a transceiver, as confirmation that the branching unit has been set to the desired state.

Figure 7:
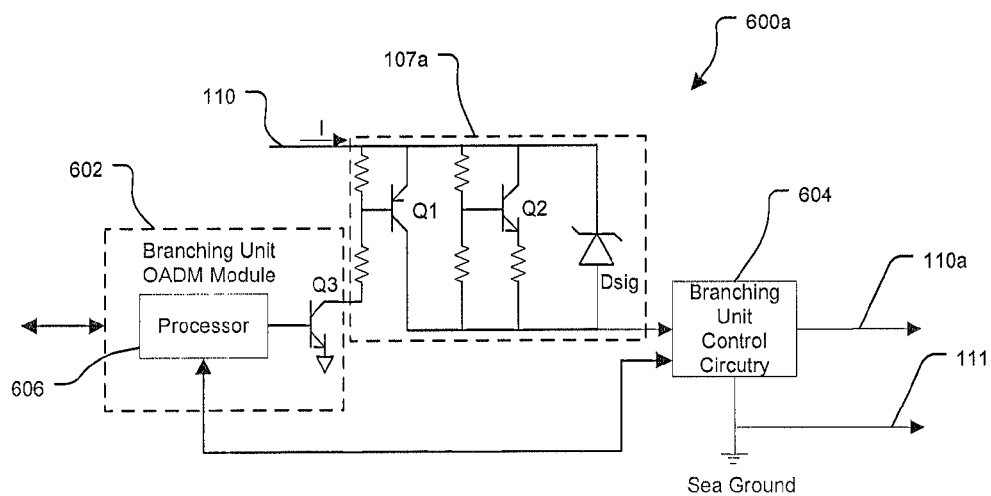
FIG. 7 is a block diagram of another exemplary embodiment of a branching unit including a cable signal generator consistent with the present disclosure.

FIG. 7 illustrates one exemplary embodiment of a branching unit 600a including a cable signal generator consistent with the present disclosure. The illustrated exemplary embodiment includes branching unit control circuitry 604 that is selectively configurable into one or more states by a command signal routed thereto by a processor 606 of a branching unit OADM module 602. The branching unit OADM module 602 also provides cable signal generator control output through resistor Q3 to selectively control line current modulation imparted by the cable signal generator.

The cable signal generator 107a may include shunt bypass circuitry including transistor Q1, and modulation circuitry including zener diode $D_{sig}$ and a power resistor circuit including transistor Q2. $D_{sig}$ establishes the voltage drop used for signaling. The power resistor circuit may be provided to take some of the current and power load off the $D_{sig}$. In one embodiment, $D_{sig}$ may be a 7V zener.

In operation, the cable signal generator 107a may have zero state, an active state and an electroding state. In the zero state Q1 may shunt line current past $D_{sig}$. In the active state Q1 may be off (non-conducting) to force line current through $D_{sig}$ to provide a non-periodic voltage modulation that may be sensed by a shore-based sensor. The processor 606 in the branching unit OADM module may be configured using hardware, software, firmware or combinations thereof to place the cable signal generator 107a in the active state when, for example, the branching unit is placed in desired state, e.g. a grounding state. The detected non-periodic voltage modulation may, therefore, act as a confirmation that the branching unit has been set to the desired state. In an electroding state, Q1 may be periodically switched on and off, e.g. at 25 Hz to modulate the voltage drop across the cable signal generator 107a and generate a corresponding line current modulation that may be sensed, e.g. by sensors 124, to assist in locating the branching unit. In one exemplary embodiment, the branching unit voltage may be about 25.4 V in a zero state, about 32.2 V in an active state, and may by modulated by about 6.8V at 25 Hz in an electroding state to cause a corresponding line current modulation depending on the dynamic resistance of the cables carry the line current.

When the branching unit 600a is in a normal state, i.e. with the incoming transmission cable 110 and outgoing transmission cable 110a isolated from ground, the voltage modulation imparted by the cable signal generator 107a may appear between the incoming 110 and outgoing 110a transmission cables. However, when the branching unit 600a is in a grounded state the voltage modulation imparted by the cable signal generator 107a may appear the branching unit power path. For example, if the branching unit 600a is powered by line current from the incoming cable 110 to sea ground, the modulation may appear at the incoming cable port, but if the branching unit is powered by current from the sea ground to the outgoing cable 110a, the voltage modulation may appear at the outgoing cable port. When the cable signal generator 107a is in an electroding state, the line current modulation may appear at the port supporting power to the branching unit, i.e. the incoming or outgoing cable port. It is contemplated herein, however, that a cable signal generator consistent with the present disclosure may be configured to provide line current modulation at the branching cable 111 port.

According to one aspect of the present disclosure, therefore, there is provided an optical communication system including: a transmitter configured to transmit an optical signal; a receiver configured to receive the optical signal; and a transmission path extending between the transmitter and the receiver. The transmission path may include an optical transmission cable and at least one cable signal generator coupled to the transmission cable. The cable signal generator may include line current modulation circuitry configured to impart modulation in line current provided on a power conductor of the cable in response to a command signal transmitted on an optical fiber of the cable.

According to another aspect of the disclosure there is provided a cable signal generator for coupling to an optical transmission cable, the optical transmission cable including a power conductor for supplying power to components coupled to the optical transmission cable and at least one optical fiber. The cable signal generator may include line current modulation circuitry configured to impart modulation in line current provided on the power conductor of the cable in response to a command signal transmitted on the optical fiber of the cable According to yet another aspect of the present disclosure, there is provided a method of signaling from an undersea element of an optical communication system, the method including: modulating a line current through the element, the line current being supplied by a power conductor of an optical transmission cable coupled to the element; and detecting the modulated current.

The embodiments that have been described herein are but some of the several which utilize this disclosure and are set forth here by way of illustration but not of limitation. Many other embodiments, which will be readily apparent to those skilled in the art, may be made without departing materially from the spirit and scope of the disclosure.

What is claimed is:

1. An optical communication system comprising:
a transmitter configured to transmit an optical signal;
a receiver configured to receive said optical signal; and
a transmission path extending between said transmitter and said receiver, said transmission path comprising,
an optical transmission cable comprising an electrical power conductor and at least one optical fiber, and
at least one cable signal generator coupled to said optical transmission cable and positioned in an undersea location between said transmitter and said receiver, said cable signal generator comprising line current modulation circuitry configured to impart modulation in line current provided on said power conductor of said cable, whereby said modulation is imparted at said undersea location between said transmitter and said receiver, said modulation being in response to a command signal transmitted to said cable signal generator on said optical fiber of said cable,
wherein said line current modulation circuitry comprises modulation circuitry and shunt bypass circuitry, said shunt bypass circuitry being configured for selectively shunting said line current around said modulation circuitry, and
wherein said line current modulation is imparted in response to a modulation of voltage across said cable signal generator imparted by said modulation circuitry.

2. The system according to claim 1, said cable signal generator further comprising an optical add-drop multiplexer for directing said command signal to said line modulation circuitry.

3. The system according to claim 1, wherein said modulation is a non-periodic modulation.

4. The system according to claim 1, said system further comprising a detector configured for detecting said line current modulation.

5. The system according to claim 1, wherein said cable signal generator is as a component of an undersea element coupled to said transmission path.

6. The system according to claim 5, wherein said component comprises a branching unit, and wherein said branching unit comprising an optical add-drop multiplexer for providing said command signal to said line modulation circuitry.

7. The system according to claim 6, wherein said command signal comprises a branching unit command signal for configuring said branching unit in a desired state.

8. A cable signal generator for coupling to an optical transmission cable, the optical transmission cable including a power conductor for supplying power to components coupled to said optical transmission cable and a least one optical fiber, said cable signal generator comprising:
line current modulation circuitry configured to impart modulation in line current provided on said power conductor of said cable, whereby said modulation is imparted at an undersea location between a transmitter and receiver coupled to said transmission cable, said modulation being in response to a command signal transmitted to said cable signal generator on said optical fiber of said cable,
wherein said line current modulation circuitry comprises modulation circuitry and shunt bypass circuitry, said shunt bypass circuitry being configured for selectively shunting said line current around said modulation circuitry, and
wherein said line current modulation is imparted in response to a modulation of voltage across said cable signal generator imparted by said modulation circuitry.

9. The cable signal generator according to claim 8, said cable signal generator further comprising an optical add-drop multiplexer for directing said command signal to said line modulation circuitry.

10. The cable signal generator according to claim 8, wherein said modulation is a non-periodic modulation.

11. The cable signal generator according to claim 8, said system further comprising a detector configured for detecting said line current modulation.

12. The cable signal generator according to claim 8, wherein said cable signal generator is a component of an undersea element coupled to said transmission path.

13. The cable signal generator according to claim 12, wherein said component comprises a branching unit, and wherein said branching unit comprising an optical add-drop multiplexer for providing said command signal to said line modulation circuitry.

14. A method of signalling from an undersea element of an optical communication system, said method comprising:
   operating a cable signal generator in said undersea element for selectively shunting line current through said undersea element to modulate said line current, said line current being supplied by a power conductor of an optical transmission cable coupled to said element, said modulating being performed at an undersea location between a transmitter and receiver of the optical communication system and being in response to a command signal transmitted to said cable signal generator on an optical fiber of the optical transmission cable; and
   detecting said modulated current.

15. The method according to claim 14, wherein said modulating comprises imparting a non-periodic modulation to said line current.

16. The method according to claim 14, wherein said detecting comprises deploying a sensor from a ship and positioning said sensor adjacent said element in an undersea environment.

* * * * *